April 13, 1937.  E. C. LONG  2,076,822
PISTON FOR INTERNAL COMBUSTION MOTORS
Filed Sept. 12, 1934
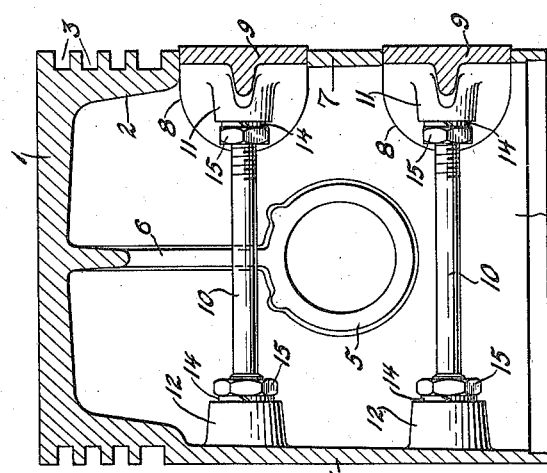
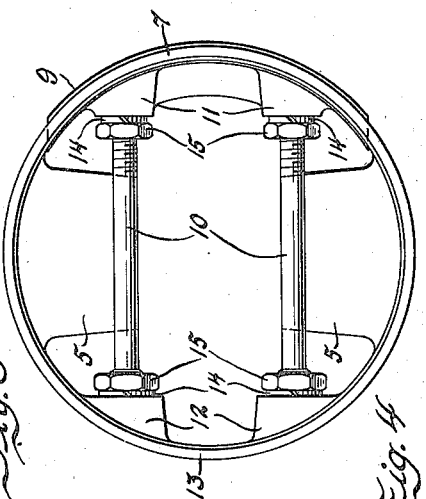
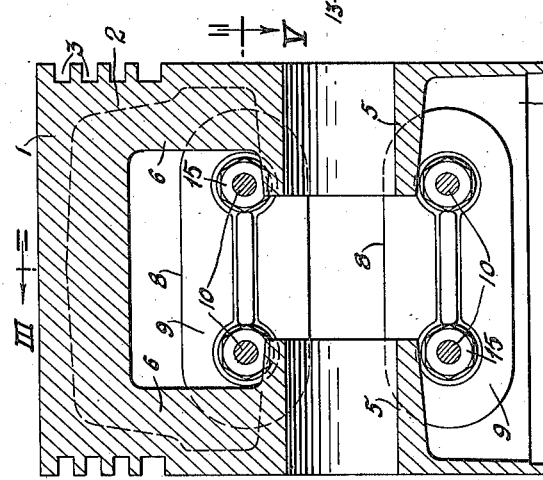
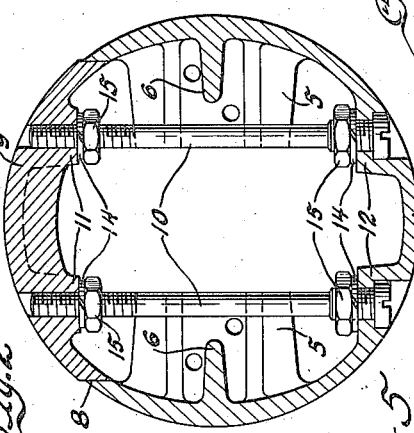
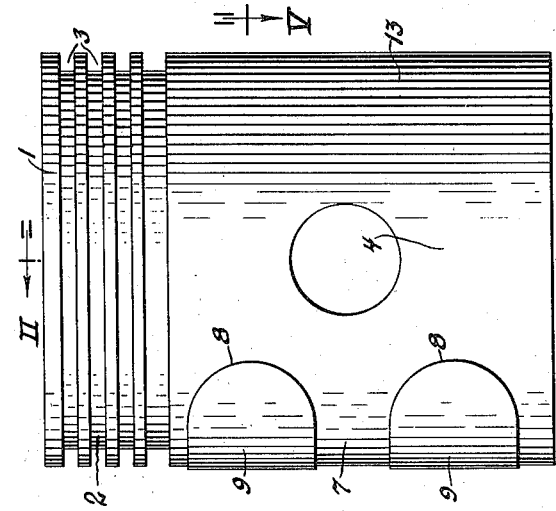
INVENTOR.
Elmer C. Long
BY Herbert G. Fletcher
ATTORNEY.

Patented Apr. 13, 1937

2,076,822

UNITED STATES PATENT OFFICE 2,076,822

PISTON FOR INTERNAL COMBUSTION MOTORS

Elmer C. Long, Grosse Pointe Park, Mich.

Application September 12, 1934, Serial No. 743,680

12 Claims. (Cl. 309—13)

This invention relates to pistons for internal combustion motors and pertains more particularly to that character of pistons made of aluminum alloy.

The main object of the invention is to provide a trunk type piston with a structure in the skirt thereof for maintaining the power thrust side of the skirt at all times against the cylinder wall, and for providing expansion clearance of the skirt on the compression thrust side of the piston without there being any crowding or seizing of the skirt with the cylinder, and at the same time permitting only a minimum clearance between the piston and cylinder, whereby piston-slap is entirely eliminated.

Another object of the invention is to provide one thrust side of the piston skirt with a cylinder bearing block which will be unaffected by expansion of the piston.

Specifically, the invention resides to provide a piston having an inserted cylinder bearing block in one of its thrust sides which is supported from the other thrust side by a structure of a material different than the piston, wherein the piston body may expand or contract independently of the bearing block and its supporting structure.

A further object of the invention is to provide a conventional trunk piston with an inserted cylinder bearing block in one side of the skirt, which is adjustably supported from the opposite side of the skirt.

Other and further objects will appear in the specification and be specifically pointed out in the appended claims, reference being had to the accompanying drawing, exemplifying the invention, and in which:—

Figure 1 is a side elevation of the piston taken on one of the pin boss sides.

Figure 2 is a vertical section taken approximately on the line II—II of Fig. 1.

Figure 3 is a vertical section taken approximately on the line III—III of Fig. 2.

Figure 4 is an inverted view of Fig. 1.

Figure 5 is a transverse section taken on the line V—V of Fig. 2.

Referring by numerals to the accompanying drawing, this improved piston comprises a head 1 having a side wall 2 with packing ring grooves 3 on its outer periphery, and formed integral with the surrounding side wall 2 of the head is a skirt 4.

Opposing pin bosses 5 are formed integral with and extend inwardly from the skirt, and joining the top side of each pin boss is a rib 6, said ribs extending upwardly and joining across the head, as shown in Figs. 2 and 3.

The above defined description is of a conventional trunk type piston, the invention applying to the application of one or more inserted cylinder engaging blocks in one of the thrust sides of the piston skirt. To this end, the compression thrust side 7 of the skirt is utilized, and in this disclosure the compression thrust side 7 is cut out through the thickness of the skirt wall above and below the pin bosses to a distance of approximately 90 degrees of the skirt circumference, as designated at 8.

The cut out portions 8 provide transversely disposed elongated openings, and mounted in each opening is a cylinder bearing block or shoe 9 of the approximate size and shape of respective openings for proper fitting relation therein. Each block 9 is held in position by respective pairs of steel rods 10 which threadingly engage the lugs 11 of respective blocks at one end and are threadingly engaged at their opposite ends in a respective lug 12 extended from the power thrust side 13 of the skirt 4. The ends of each rod 10 are provided with a lock washer 14 and a lock nut 15.

The blocks 9 may be of any good bearing material, such as either aluminum alloy, cast iron or other suitable material, and the rods 10 when being engaged to the shoes and the power thrust side 13 of the skirt, are manipulated and locked in positions wherein the diameter of the skirt 4 across the periphery of the power thrust side 13 and the peripheries of the shoes 9, will be the cylinder diameter minus a minimum operating clearance. This diameter should be greater than the diameter across the thrust sides 13 and 7 so that the peripheries or outer surfaces of the blocks or shoes 9 project beyond the periphery or surface of the compression thrust side 7 so as to allow for expanding clearance of the piston and/or piston skirt, across the power thrust side 13 to the compression thrust side 7.

While the rods 10 have been referred to as being of steel, they may be of any suitable material having a low coefficient of thermal expansion, comparable with the piston, which by reason of being made of aluminum alloy metal, is of a relatively high co-efficient of thermal expansion.

This difference in materials and the manner in which the cylinder bearing blocks 9 are supported from the power thrust side 13 of the skirt 4, will permit independent expansion and contraction of the piston body relative to the cylinder bearing blocks 9.

In the operation of a piston of this character, when mounted in the cylinder of an internal combustion motor, as the diameter across the thrust side 13 to the peripheries of the shoes 9 is the diameter of the cylinder minus a minimum running or operating clearance, the piston will be reciprocated in the cylinder without any piston-slap heretofore due to a cold cylinder and/or piston. As the cylinder bearing blocks 9 on the compression thrust side 7 of the skirt, project and engage the cylinder on one side, the periphery of the thrust side 7 will be free or away from the cylinder, while the power thrust side 13 of the skirt will be in contact with the cylinder.

When the motor and/or the piston becomes heated, expansion of the aluminum alloy piston body will occur and the direction of expansion with respect to the cylinder will be from the power thrust side 13 to the compression thrust side 7, and as clearance is originally provided between the compression thrust side and the cylinder, there will be no seizing of the piston body due to the growing enlargement of the skirt 4 on a diameter across the thrust sides. As the rods 10 have a low co-efficient of thermal expansion, the cylinder bearing blocks 9 supported by said rods, will be held against being moved outwardly by expansion or at least will be expanded or moved to a lesser degree than is the piston body.

From the above manner of operation of this improved piston, it is apparent that the amount of projection of the cylinder bearing blocks 9 beyond the periphery of the compression thrust side 7, must be an amount at least equal to the maximum amount of expansion necessary for the compression thrust side periphery to become flush with the bearing surfaces of the blocks.

After a period of wear on the piston skirt and/or the cylinder bearing blocks 9, said blocks may be adjusted outwardly by manipulation of their supporting rods 10 for taking up the wear.

While two cylinder bearing blocks are shown, it is anticipated that but a single cylinder bearing block of the character described may be used, and further, a single centrally disposed supporting rod for the shoe above the pin bosses, may be used. Various changes may be made in the details of construction without departing from the spirit of this invention, and it is therefore to be understood that this invention is not to be limited to the specific construction shown and described.

What I claim is:—

1. A trunk piston having a skirt, a cylinder bearing block inserted in an opening formed in the skirt intermediate of its length, and a rigid member having a relatively low coefficient of thermal expansion connected at one end to the block and at its other end to the opposite side of the skirt.

2. A trunk piston having a skirt with a pair of vertically alining openings formed therein, a cylinder bearing block mounted in each opening, and a rigid thrust member connected at one end to each block and having their other ends connected to the opposite side of the skirt, for thrusting the faces of said blocks beyond the periphery of the skirt.

3. A trunk piston having a skirt which is provided with a pair of longitudinally alining openings, a cylinder bearing block mounted in each opening, and an adjustable thrust member having a less co-efficient of thermal expansion than the skirt and connected to each block at one end and at their opposite ends to the opposite side of the skirt, for rigidly thrusting the faces of said blocks beyond the periphery of the skirt.

4. A piston comprising a head, a skirt and pin bosses, the skirt having a transversely elongated opening formed therein in a plane between the head and pin boss axis, an elongated cylinder bearing block mounted in the opening, and a rigid support for the block connected to the opposite side of the skirt.

5. A piston for an internal combustion motor comprising a body portion of relatively high co-efficient of expansion having a full skirt, a cylinder bearing block inserted in an opening formed in the wall of the skirt intermediate of its length, and a rigid thrust member having a relatively low co-efficient of thermal expansion and secured at one end to said block and at its opposite end to the opposite side of the skirt.

6. A piston for an internal combustion motor cylinder comprising a body portion of relatively high co-efficient of expansion having a full skirt, a cylinder bearing block inserted in an opening formed in the wall of the skirt intermediate of the skirt length, and a rigid member having a relatively low co-efficient of thermal expansion and secured at one end to said block and at its opposite end to the opposite side of the skirt for closely fitting the block to the cylinder wall, while the body portion expands and contracts independently of the block.

7. A piston comprising a body portion having a head, a skirt and pin bosses, said body portion being of material of relatively high co-efficient of expansion, said skirt being continuous in its circumference and having a pair of transversely elongated openings disposed in longitudinal alinement with each other in one of the skirt thrust sides, one of said openings being disposed in a plane between the head and the pin boss axis and the other opening being disposed in a plane beneath the pin boss axis, a cylinder bearing block inserted in each opening and a transversely disposed member having a relatively low co-efficient of thermal expansion connected to each block at one end and at their other ends to the opposite thrust side of the skirt.

8. A piston comprising a body portion having a head, a skirt and pin bosses, said body portion being of material of relatively high coefficient of expansion, said skirt being continuous in its circumference and having a pair of transversely elongated openings disposed in longitudinal alinement with each other in one of the skirt thrust sides, one of said openings being disposed in a plane between the head and the pin boss axis and the other opening being disposed in a plane beneath the pin boss axis, a cylinder bearing block inserted in each opening and a transversely disposed member having a relatively low co-efficient of thermal expansion connected to each block at one end and at their other ends to the opposite thrust side of the skirt, said members serving to retain said blocks in fixed position while the body portion is free to expandingly grow around the blocks, when the piston becomes heated.

9. A trunk piston having a skirt, a cylinder bearing portion mounted in a conforming opening which is formed in the skirt intermediate of its length, said cylinder bearing portion having direct rigid supporting connection with the opposite side of the skirt.

10. A piston comprising a body portion having a head, a skirt and pin bosses, said body portion being of material of relatively high co-efficient of expansion, said skirt having opposing thrust sides, one of said thrust sides having an opening which is formed intermediate of its length, a cylinder bearing block inserted in said opening and a transversely disposed rigid thrust member having a relatively low co-efficient of thermal expansion and connected to said block at one end and at its other end to the opposite thrust side of the skirt.

11. A piston comprising a body portion having a head, a skirt and pin bosses, said body portion being of material of relatively high co-efficient of expansion, said skirt having opposing thrust sides, one of said thrust sides having an opening which is formed intermediate of its length, a cylinder bearing block inserted in said opening and a transversely disposed rigid thrust member having a relatively low co-efficient of thermal expansion and connected to said block at one end and at its other end to the opposite thrust side of the skirt, said member serving to retain said block in fixed position while the body portion is free to expandingly grow around the block, when the piston becomes heated.

12. A piston comprising a body portion having a head and the head having a side wall, a skirt and pin bosses extending from the skirt, said body portion being of material of relatively high co-efficient of expansion, said skirt having opposing thrust sides continuous with the side wall of the head, one of said thrust sides having an opening which is formed intermediate of its length, a cylinder bearing block inserted in said opening and a pair of rigid transversely disposed thrust members having a relatively low co-efficient of thermal expansion and connected to said block at one end and at their other ends to the opposite thrust side of the skirt, said members serving to retain said block in fixed position while the body portion is free to expandingly grow around the block, when the piston becomes heated.

ELMER C. LONG.